US010481987B2

(12) United States Patent
Gallagher et al.

(10) Patent No.: US 10,481,987 B2
(45) Date of Patent: *Nov. 19, 2019

(54) STORAGE POLICY-BASED AUTOMATION OF PROTECTION FOR DISASTER RECOVERY

(71) Applicant: VMware, Inc., Palo Alto, CA (US)

(72) Inventors: Ryan David Gallagher, Sunnyvale, CA (US); Ilia Langouev, Santa Cruz, CA (US); Glenn Bruce McElhoe, Arlington, MA (US); Aleksey Pershin, Fremont, CA (US); Sudarsan Piduri, Campbell, CA (US)

(73) Assignee: VMware, Inc., Palo Alto, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 15/811,649

(22) Filed: Nov. 13, 2017

(65) Prior Publication Data

US 2018/0067827 A1    Mar. 8, 2018

Related U.S. Application Data

(63) Continuation of application No. 14/473,984, filed on Aug. 29, 2014, now Pat. No. 9,817,722.

(51) Int. Cl.
*G06F 11/00* (2006.01)
*G06F 11/14* (2006.01)
*G06F 11/20* (2006.01)

(52) U.S. Cl.
CPC ...... *G06F 11/1484* (2013.01); *G06F 11/1448* (2013.01); *G06F 11/203* (2013.01);
(Continued)

(58) Field of Classification Search
CPC ............ G06F 11/1088; G06F 11/1096; G06F 11/1612
(Continued)

(56) References Cited

U.S. PATENT DOCUMENTS 5,765,171 A    6/1998 Gehani
7,685,378 B2 * 3/2010 Arakawa ............. G06F 11/1471
                                                    711/154
(Continued)

OTHER PUBLICATIONS

Final Office Action from U.S. Appl. No. 14/863,336, dated May 3, 2018, 7 pages.
(Continued)

*Primary Examiner* — Sarai E Butler
(74) *Attorney, Agent, or Firm* — Fish & Richardson P.C.

(57) ABSTRACT

Exemplary methods, apparatuses, and systems include a recovery manager receiving selection of a storage profile to be protected. The storage profile is an abstraction of a set of one or more logical storage devices that are treated as a single entity based upon common storage capabilities. In response to the selection of the storage profile to be protected, a set of virtual datacenter entities associated with the storage profile is added to a disaster recovery plan to automate a failover of the set of virtual datacenter entities from a protection site to a recovery site. The set of one or more virtual datacenter entities includes one or more virtual machines, one or more logical storage devices, or a combination of virtual machines and logical storage devices. The set of virtual datacenter entities is expandable and interchangeable with other virtual datacenter entities.

20 Claims, 4 Drawing Sheets

(52) U.S. Cl.
CPC ...... *G06F 11/2038* (2013.01); *G06F 11/2048* (2013.01); *G06F 11/2097* (2013.01)

(58) Field of Classification Search
USPC .......................................................... 714/6.3
See application file for complete search history.

(56) References Cited

U.S. PATENT DOCUMENTS

| | | | |
|---|---|---|---|
| 7,822,749 | B2 | 10/2010 | Prahlad |
| 9,645,899 | B1 | 5/2017 | Felstaine et al. |
| 9,817,722 | B2 | 11/2017 | Gallagher et al. |
| 2005/0033757 | A1 | 2/2005 | Greenblatt et al. |
| 2005/0060275 | A1 | 3/2005 | Steuernagel et al. |
| 2005/0289553 | A1 | 12/2005 | Miki |
| 2008/0133871 | A1* | 6/2008 | Holt ................... H04L 67/1095 711/173 |
| 2009/0313503 | A1* | 12/2009 | Atluri ................. G06F 11/1453 714/19 |
| 2010/0115329 | A1* | 5/2010 | Tanaka ................. G06F 11/201 714/5.11 |
| 2011/0022574 | A1* | 1/2011 | Hansen ............... G06F 11/2097 707/698 |
| 2013/0024426 | A1 | 1/2013 | Flowers et al. |
| 2013/0036323 | A1* | 2/2013 | Goose ................. G06F 11/1484 714/4.11 |
| 2014/0081906 | A1 | 3/2014 | Geddam et al. |
| 2014/0189441 | A1* | 7/2014 | Ishida ................. G06F 11/3006 714/47.3 |
| 2014/0317438 | A1* | 10/2014 | Ripoll ................. G06F 11/2035 714/4.11 |
| 2016/0162370 | A1 | 6/2016 | Mehta et al. |
| 2017/0060899 | A1 | 3/2017 | Farkas et al. |
| 2017/0060900 | A1 | 3/2017 | Marinov et al. |

OTHER PUBLICATIONS

'Microsoft Azure' [online]. "Getting Started with Azure Site Recovery: On-Premises to On-Premises Protection," available on or before Jul. 6, 2014, via internet archive: Wayback Machine URL <https://web.archive.org/web/20140706144528/azure.microsoft.com/en-us/documentation/articles/hyper-v-recovery-manager-configure-vault>, [retrieved on Aug. 27, 2014], retrieved from: URLL < http://azure.microsoft.com/en-us/documentation/>, 17 pages.

Cook Joe., "VMware vSphere Blog, vSphere Storage Policy Based Management Overview", part 1, posted on Sep. 29, 2014, http://blogs.vmware.com/vsphere, 8 pages.

Cook Joe., "VMware vSphere Blog, vSphere Storage Policy Based Management Overview", part 2, posted on Oct. 9, 2014, http://blogs.vmware.com/vsphere, 8 pages.

Final Office Action from U.S. Appl. No. 14/473,984 dated Oct. 20, 2016, 15 pages.

Getting Started with Azure Site Recovery: On—Premises to On—Premises Protection. Microsoft Azure, http://azure.microsoft.com/en-us/documentation/, downloaded on Aug. 27, 2014, Microsofl2014, 16 pages.

Non-Final Office Action from U.S. Appl. No. 14/473,984, dated Jan. 26, 2017, 14 pages.

Non-Final Office Action from U.S. Appl. No. 14/473,984 dated Mar. 25, 2016, 18 pages.

Non-Final Office Action from U.S. Appl. No. 14/863,336, dated Sep. 20, 2017, 23 pages.

Notice of Allowance from U.S. Appl. No. 14/473,984, dated Jul. 21, 2017, 8 pages.

Non-Final Office Action from U.S. Appl. No. 14/863,336, dated Aug. 15, 2018, 8 pages.

Non-Final Office Action from U.S. Appl. No. 14/863,314, dated Sep. 7, 2018, 25 pages.

Final Office Action from U.S. Appl. No. 14/863,314, dated May 16, 2019, 18 pages.

* cited by examiner

STORAGE POLICY-BASED AUTOMATION OF PROTECTION FOR DISASTER RECOVERY

CROSS-REFERENCE TO RELATED APPLICATIONS

This application is a continuation of U.S. patent application Ser. No. 14/473,984, filed Aug. 29, 2014, which is hereby incorporated by reference.

FIELD OF THE INVENTION

The various embodiments described herein relate to managing virtual machine migration across two different datacenter sites. In particular, embodiments relate to automating the protection of virtual machines for disaster recovery based upon one or more storage profiles.

BACKGROUND OF THE INVENTION

An important consideration for the architecture of a virtual datacenter includes the provisioning of virtual machines to the proper storage such that the storage meets certain service level agreements (SLAs) or other service goals. For example, storage may be selected based upon capacity, performance, availability, redundancy, etc. needed for a particular application running on the virtual machine. Another important consideration includes maximizing the availability of the services provided by the virtual machines. Availability solutions are designed to improve the resiliency of local systems or entire sites. Disaster recovery is an availability solution for recovering all or a portion of a datacenter at a recovery site from replicated data. For example, a logical storage device within a protected datacenter site may be configured for active-passive replication to a recovery datacenter site. A disaster recovery tool may initiate recovery of all or a portion of the replicated data within the protected datacenter by making the recovery logical storage device active and registering all the virtual machines stored in the recovery logical storage device at the recovery datacenter.

Due to their separate knowledge domains, the tasks of configuring storage and replication are separate from the tasks for provisioning and maintaining individual virtual machines in a typical enterprise. A storage administrator typically handles the former while an application owner or virtual infrastructure user handles the latter. The execution of these tasks for each application typically follows a business workflow that includes the application owner requesting storage from the storage administrator that meets specific requirements. The storage administrator uses the specific requirements in the request to provision one or more storage devices with the corresponding capabilities. Information about the provisioned storage is given to the application owner who, in turn, provisions virtual machine(s) for the application(s) using the storage.

The selection of storage devices to meet SLAs may be decoupled from this application management workflow through the use of storage profiles. A storage profile abstracts a set of logical storage devices as a single entity providing specific storage capabilities. The set of logical storage devices backing each storage profile is elastic and fungible. As a result, an application owner is agnostic to the actual storage used and may simply select the storage profile that meets the application SLAs.

Disaster recovery planning, however, involves both recovering the replicated storage devices (e.g., for array-based replication) and the virtual machines residing on them. Disaster recovery is dependent upon the storage being replicated and otherwise configured for recovery within another site. Additionally, if the logical storage device(s) used by the corresponding virtual machine change, the corresponding disaster recovery plans need to be updated. As a result, storage administration tasks have not been decoupled from disaster recovery planning.

BRIEF DESCRIPTION OF THE DRAWINGS

The present invention is illustrated by way of an example and not limited to the figures and the accompanying drawings, in which like references indicate similar elements, and in which.

DETAILED DESCRIPTION

Embodiments described herein utilize storage profiles to automatically configure disaster recovery protection for the corresponding virtual machines. As a result, storage administration tasks are decoupled from disaster recovery planning. For example, an application administrator can use a storage profile to both provision a virtual machine on the appropriate, replicated logical storage device and configure disaster recovery for that virtual machine. Additionally, moving the virtual machine to a different replicated logical storage device does not affect the disaster recovery planning for that virtual machine. The recovery plan is automatically updated as needed.

Figure 1:
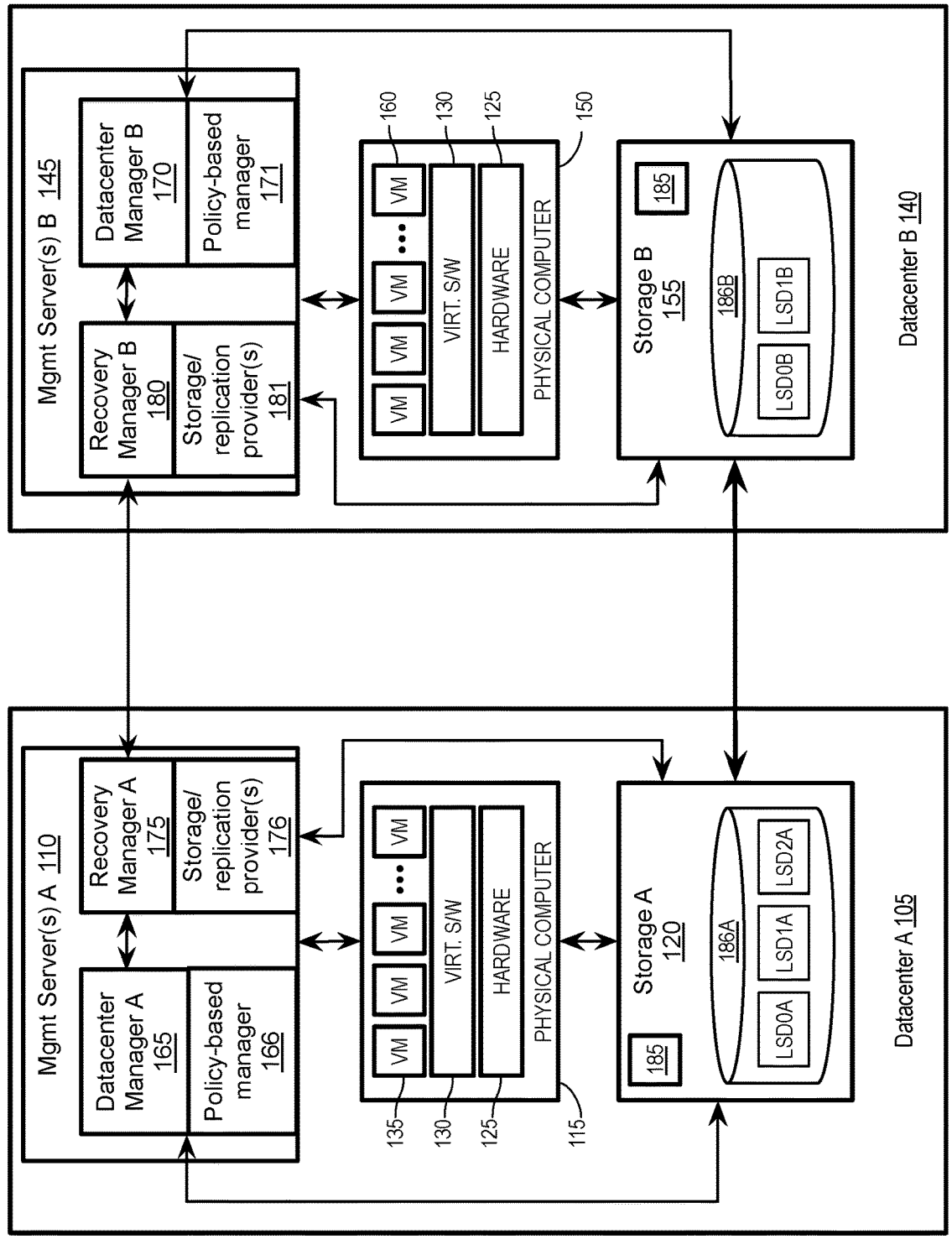
FIG. 1 illustrates, in block diagram form, exemplary virtual datacenters configured to automate the protection of virtual machines for disaster recovery based upon one or more storage profiles.

FIG. 1 illustrates, in block diagram form, exemplary virtual datacenters configured to automate the protection of virtual machines for disaster recovery based upon one or more storage profiles. Datacenter A 105 includes management server(s) A 110, one or more host devices 115, and storage A 120. Each host device 115 includes hardware 125, virtualization software layer 130 (also referred to as a hypervisor), and virtual machines (VMs) 135. Similarly, datacenter B 140 includes management server(s) B 145, one or more host devices 150, and storage B 155. Each host device 150 includes hardware 125, virtualization software layer 130, and VMs 160. In one embodiment, datacenter A 105 represents a first datacenter site and datacenter B 140 represents a second, geographically distinct datacenter site.

VMs 135/160 are complete computation environments, containing virtual equivalents of the hardware and system software components of a physical system and are typically implemented by an extensive virtualization infrastructure, which includes a variety of software and hardware components. For example, one or more of the VMs may implement virtual desktops. A virtual desktop is a virtual computing system that operates as a desktop or workstation computer with which an end user can interact using a desktop remoting protocol over a network. In one embodiment, one or more of the VMs implement a virtualized compute, networking, storage, or security service (e.g., a firewall, webserver, database server, etc.).

Virtualization software layer 130 runs on hardware 125 of host device (e.g., a physical computer) 115/150 and manages one or more VMs 135/160. Virtualization software layer 130 manages physical resources, e.g., hardware 125, as well as maintains virtual-to-physical hardware mappings. For example, virtualization software 130 may manage VM access to a processor, memory, or network interface within hardware 125 as well as a virtual disk for each VM within underlying storage 120/155.

Each of storage A 120 and storage B 155 includes one or more physical storage devices. In one embodiment, storage A 120 and storage B 155 include storage controllers 185 to serve read and write requests and management commands/queries from host devices 115/150 and management servers 110/145. Each of storage A 120 and storage B 155 is partitioned into logical units, volumes, virtual volumes, and/or disks (which are collectively referred to herein as logical storage devices) that are stored on one or more of the physical storage devices. Each logical storage device is identified by a device identifier, e.g., a logical unit number (LUN), volume identifier, etc. For example, storage A 120 is illustrated as including logical storage devices LSD0A, LSD1A, and LSD2A within array 186A and storage B 155 is illustrated as including logical storage devices LSD0B and LSD1B within array 186B. Each of storage A 120 and storage B 155 may include additional arrays, logical storage devices, or other partitions of storage.

In one embodiment, one or more of the logical storage devices in each of storage A 120 and storage B 155 is a stretched storage device. For example, logical storage devices LSD0A and LSD0B may be implemented as a single stretched storage device that is stretched across datacenter A 105 and datacenter B 140 with the logical storage devices LSD0A and LSD0B being copies of the same data within the respective datacenter. A network administrator may configure logical storage devices LSD0A and LSD0B for active-active replication such that writes are committed synchronously at both locations to ensure that the two copies of the data are consistent. In an active-active configuration, both copies of the data are available for read and write commands from VMs 135/160 in the respective datacenter or in both datacenters. The network administrator may further designate a protected site, a recovery site, site preference, as well as recovery preferences for the stretched storage devices LSD0A and LSD0B.

Additionally, a network administrator may configure storage A 120 for active-passive replication of, e.g., logical storage device LSD0A, to storage B 155, e.g., logical storage device LSD0B. As used herein, active-passive replication provides a redundant copy of a logical storage device within the recovery datacenter, which is only brought online when the associated primary storage device within the protected datacenter fails or subject to a planned failover. For example, the active instance, logical storage device LSD0A, is available for read and write commands from VMs 135 in host device(s) 115. The passive instance, logical storage device LSD0B, is a copy of logical storage device LSD0A and not available for read and write commands from any VMs 135/160 or hosts device(s) 115/150 in order to prevent corruption of the replicated data.

Management server(s) A 110 includes datacenter manager A 165. In one embodiment, datacenter manager A 165 provides a management console for manual and automated control of hosts 115, VMs 135, and storage A 120. Similarly, datacenter manager B 170 provides a management console for manual and automated control of hosts 150, VMs 160, and storage B 155. For example, datacenter manager A 165 and datacenter manager B 170 provision, configure, and maintain VMs as virtual desktops or network services, manage pools of computer resources to run the VMs, etc.

In one embodiment, datacenter mangers 165/170 include or otherwise work cooperatively with respective policy-based managers 166/171. As described above, storage goals or requirements, such as performance, availability, or other SLAs, can be associated with storage profiles. A storage profile is an abstraction of a set of one or more logical storage devices that are treated as a single entity based upon common storage capabilities. For example, a storage administrator using policy-based manager 166 defines a storage profile for a defined performance characteristic and associates logical storage devices LSD0A and LSD1A (that meet the performance characteristic) with the storage profile. In one embodiment, a storage performance characteristic/capability is represented by a key-value pair, where the key is a specific property that the logical storage device can offer and the value is a metric, or a range, that the logical storage device guarantees for a provisioned object, such as a virtual machine metadata object or a virtual disk. For example, storage performance capabilities include capacity, storage space reservation, failure tolerance, cache size, performance speed, availability, redundancy, etc. In one embodiment, logical storage devices are associated with a storage profile through the use of tags stored in metadata for the corresponding logical storage devices and/or in a data structure maintained by the policy-based manager 166/171.

Policy-based managers 166/171 may further associate VMs with storage profiles. The association of a VM with a storage profile indicates that the VM should reside on the single logical storage entity represented by the storage profile (e.g., on one or more of the logical storage devices within the storage profile). A VM may be included within or otherwise associated with a storage profile based upon a requirement for a minimum storage capability. For example, a storage administrator or the application administrator (end user) for VM 135 uses policy-based manager 166 to create an association between VM 135 and a corresponding storage profile. The administrator may associate a high-priority VM with a storage profile that guarantees a high level of storage performance/reliability and low-priority VM with a storage profile that does not guarantee such a high level of storage performance/reliability. In one embodiment, VMs are associated with a storage profile through the use of a tag stored in metadata for the corresponding VM and/or in a data structure maintained by the policy-based manager 166/171.

Management servers 110/145 further include recovery managers 175/180. The recovery managers 175/180 provide administrative access to define protection groups, recovery plans, a preferred recovery type, and other failover policies. Recovery managers 175/180 further provide the implementation for unplanned failover, planned failover, test failover, and other data availability/recovery workflows. Additionally, as described further herein, recovery managers 175/180 automate the protection of virtual machines for disaster recovery based upon the inclusion of one or more storage profiles within a protection group. In one embodiment, datacenter managers 165/170 are implemented within different management servers 110/145 than recovery managers 175/180. For example, recovery manager 175 may be installed on a separate physical or virtual machine from datacenter manager 165. In an alternate embodiment, one or more recovery managers 175/180 are implemented by the corresponding datacenter manager(s) 165/170.

In one embodiment, recovery managers 175/180 include or otherwise work cooperatively with respective storage/replication provider(s) 176/181. In another embodiment, storage/replication provider(s) 176/181 are included within datacenter managers 165/170. For example, storage/replication provider(s) 176/181 retrieve information about storage topology, capabilities, and status from underlying storage 120/155. Each storage/replication provider 176/181 enables a corresponding recovery manager 175/180 to send and receive vender-specific commands/messages to and from storage 120/155. For example, in order to provide uniform orchestration for device discovery, failover, synchronization, and test failover workflows across disparate storage arrays in the market, a storage/replication provider specification defines commands issued by recovery manager 175/180 during the various workflows and the expected behavior of the storage arrays for these commands. A corresponding storage/replication provider 176/181 translates the recovery manager commands into vendor-specific commands. In one embodiment, storage/replication provider(s) 176/181 also maintain storage profile tag associations with logical storage devices and/or VMs. In one embodiment, storage/replication provider(s) 176/181 further configures, monitors, and/or otherwise manages individual VM or host-based replication.

Components of datacenter A 105 are coupled to components of datacenter B 140. While various components are illustrated as being directly coupled for the ease of explanation (e.g., to illustrate the direction of replicated data), a network including one or more switches or routers may lie between datacenter A 105 and datacenter B 140 and facilitate the coupling of the various components.

Figure 2:
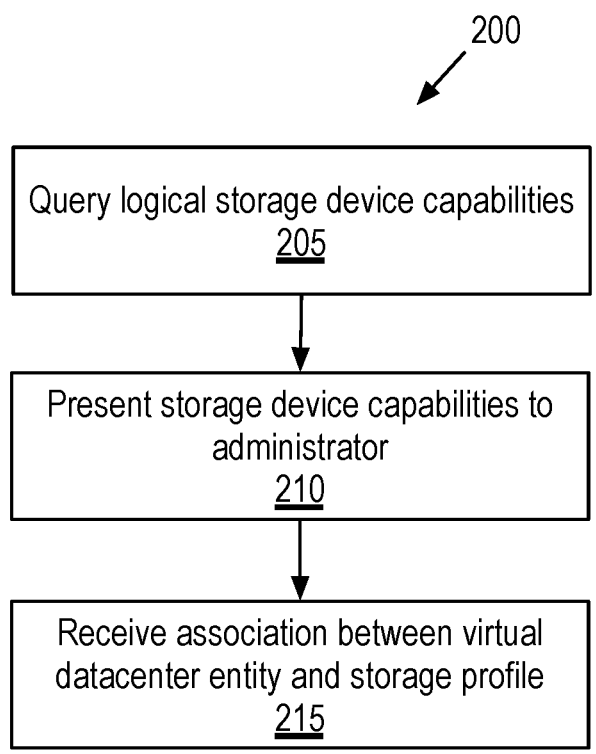
FIG. 2 is a flow chart illustrating an exemplary method of storage profile configuration.

FIG. 2 is a flow chart illustrating exemplary method 200 of storage profile configuration. At block 205, management server 110/145 queries underlying storage 120/155 for logical storage devices and their capabilities. For example, a storage administrator may initiate such a query through a management console for a management server 110/145 (e.g., datacenter manager 165/170 or recovery manager 175/180). In an alternate embodiment, the storage administrator queries underlying storage 120/155 via vendor-supplied array software.

In response to the query, management server 110/145 receives key-value pairs or other descriptions of the logical storage device capabilities from the underlying storage 120/155. At block 210, management server 110/145 presents the logical storage devices and corresponding storage capabilities to the storage administrator.

At block 215, management server 110/145 receives an association between one or more of virtual datacenter entities and a storage profile. For example, the storage administrator may select one or more logical storage devices meeting a threshold storage capability for inclusion in a particular storage profile. In one embodiment, the association between a logical storage device and a storage profile includes defining a storage profile's rule set using at least one profile tag and adding the profile tag to the logical storage device. Policy-based manager 166/171 stores the profile rule set and may subsequently discover which logical storage devices have profile tags that define the profile rule set. In an alternate embodiment, logical storage devices are automatically included in one or more storage profiles based upon their respective device capabilities. As a result, the storage profile provides an abstraction of a set of one or more logical storage devices that are treated as a single entity. The set of logical storage devices is elastic (e.g., it can be expanded/contracted to include more/less logical storage devices) and fungible (e.g., the included logical storage devices are interchangeable with other logical storage devices that provide one or more defined storage capabilities associated with the storage profile).

In another embodiment, the virtual datacenter entities are virtual machines. For example, policy-based manager 166/171 receives selection of one or more VMs to be included within or otherwise associated with the storage profile. Given that the above-described elastic and fungible qualities of the storage profile are transparent to the application administrator, an application administrator may provision VMs in a manner that is agnostic to the actual underlying logical storage devices. The application administrator may simply select the storage profile that meets the one or more SLAs for a particular application provided/required by the VM. Similar to the description of associating a logical storage device with a storage profile, the association between a VM and a storage profile includes defining a storage profile's rule set using at least one profile tag and adding the profile tag to the VM. The policy-based manager 166/171 maintains the association of this storage profile with the VM. In one embodiment, in response to the selection of the storage profile for a VM, management server 110/145 queries the policy-based manager 166/171 for associated logical storage devices and selects a logical storage device from the result set on behalf of the application administrator. In one embodiment, recovery manager 175/180 determines a set of VMs residing on the set of logical storage devices included within the selected storage profile and, in response, automatically associates the set of VMs with the storage profile.

Figure 3:
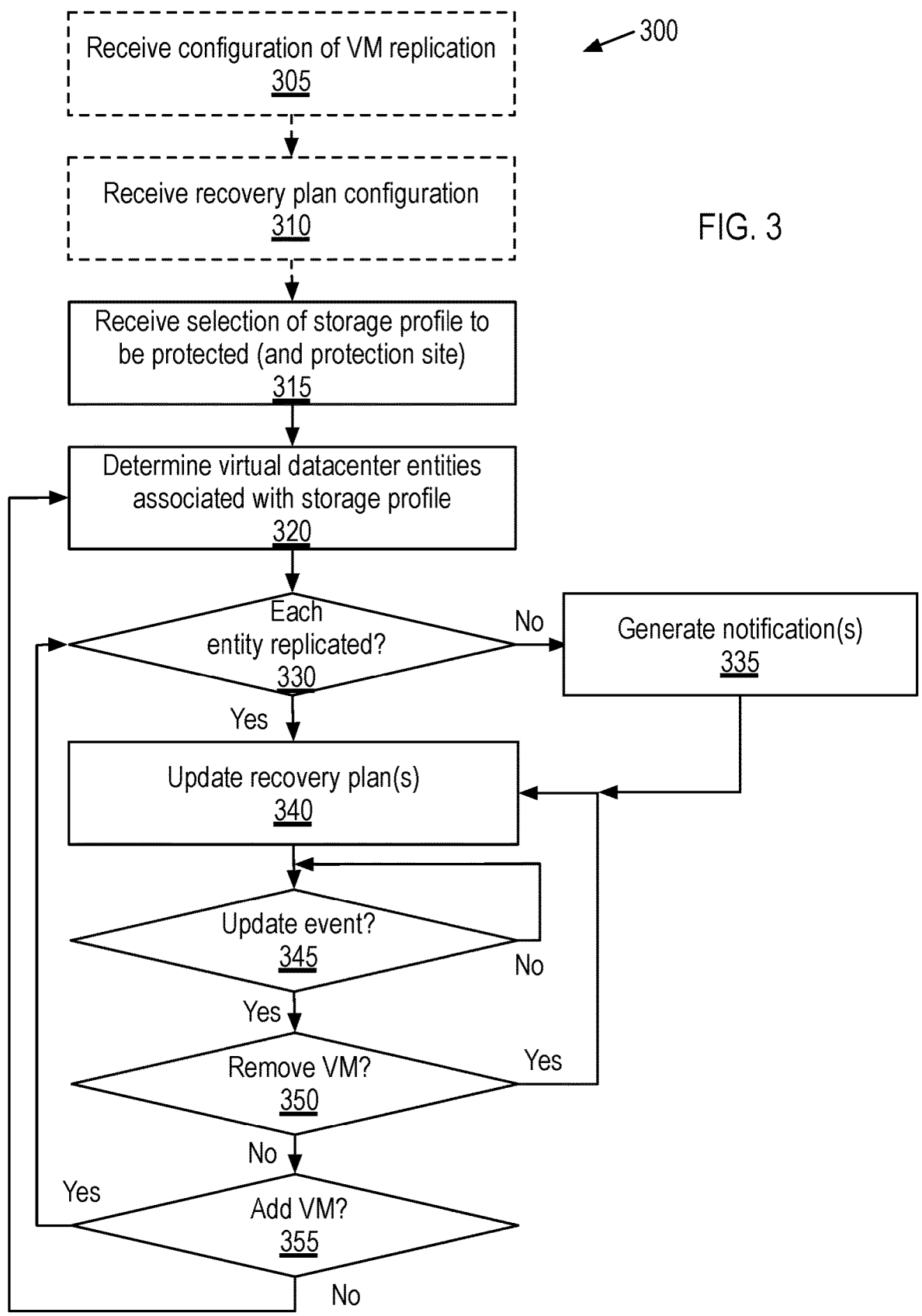
FIG. 3 is a flow chart illustrating an exemplary method of automating the protection of virtual machines for disaster recovery based upon one or more storage profiles.

FIG. 3 is a flow chart illustrating exemplary method 300 of automating the protection of logical storage devices and virtual machines for disaster recovery based upon one or more storage profiles. At block 305, datacenter manager 165/180 optionally receives configuration of the replication of one or more VMs or logical storage devices. For example, a storage administrator may select a VM 135 for host-based replication from datacenter A 105 to datacenter B 140. As another example, the storage administrator utilizes vendor provided array software to instruct the underlying storage 120/155 to replicate one or more logical storage devices. Alternatively, another management server 110/145 (e.g., recovery manager 175/180) receives the configuration of the replication of one or more VMs or logical storage devices. In yet another embodiment, replication of the logical storage devices is implemented by independent, storage vendor-supplied software.

As a result of configuring one or more virtual datacenter entities for replication, the corresponding data and metadata (e.g., virtual disks stored within logical storage devices) are replicated from the protected datacenter to the recovery datacenter. In one embodiment, the replication of a VM or logical storage device includes replication of metadata for the VM or logical storage device. For example, the storage profile tags described above may be included in such metadata and replicated to a recovery site. As a result, upon failover, corresponding storage profile tags may be used to further automate the protection of virtual machines and otherwise utilize the storage profiles for selection of logical storage devices.

At block 310, recovery manager 175/180 optionally receives configuration of a recovery plan. A recovery plan is a container of one or more protection groups (e.g., groups of VMs and/or logical storage devices) to be failed over together in a single workflow. In one embodiment, the recovery plan includes a start up order, priority order, or other customizations for the implementation of a recovery. For example, protection groups and/or individual virtual datacenter entities may be assigned priority values such that they are recovered in priority order.

At block 315, recovery manager 175/180 receives selection of a set of one or more storage profiles to be protected as a single protection group. For example, in response to a command to create or edit a protection group, recovery manager 175/180 may present an application administrator with a user interface including selectable storage profiles that have not yet been included within any protection groups. Selection of a storage profile results in the addition of the storage profile to the protection group. In one embodiment, multiple storage profiles may be added to a single protection group.

At block 320, recovery manager 175/180 determines the set of virtual datacenter entities associated with the selected storage profile. In one embodiment, the determination includes determining the set of logical storage devices included within the selected storage profile. Virtual disks for one or more VMs may be stored on set of logical storage devices included within the selected storage profile. In one embodiment, one or more logical storage devices that are included within the selected storage profile do not store any virtual machine files for virtual machines associated with the selected storage profile. As a result, storage of data other than data for VMs associated with the storage profile may also be protected by an association with a storage profile.

In response to the addition of a storage profile to a protection group, recovery manager 175/180 requests the set of logical storage devices included within the selected storage profile from policy-based manager 166/171. For example, the policy-based manager 166/171 may query the datacenter manager 165/170 or a corresponding data structure to determine which logical storage devices have the corresponding storage profile tag and returns the set to recovery manager 175/180.

In one embodiment, recovery manager 175/180 determines the set of VMs associated with or otherwise included within the storage profile. In one embodiment, recovery manager 175/180 queries policy-based manager 166/171 to determine any VMs included within the storage profile. As described above, in one embodiment, recovery manager 175/180 determines a set of VMs residing on the set of logical storage devices included within the selected storage profile and, in response, automatically associates the set of VMs with the storage profile.

At block 330, recovery manager 175/180 determines if each of the virtual datacenter entities included within the storage profile is configured for replication. For example, recovery manager 175/180 determines if each VM is either configured for array-based replication or host-based replication. In one embodiment, recovery manager 175/180 queries replication providers 176/181 to determine that at least one replication provider 176/181 (e.g., an array-based replication provider or a host-based replication provider) is responsible for replicating each VM included in the storage profile. Additionally, recovery manager 175/180 determines if each logical storage device included within the storage profile is configured for replication.

If any of the virtual datacenter entities are not replicated, at block 335, recovery manager 175/180 generates a notification or otherwise alerts the administrator that a VM was added to a protection group (via the storage profile) but is not replicated to the recovery site. In one embodiment, recovery manager 175/180 receives a request to correct or an indication of a correction of the error (such that the VM or corresponding logical storage device is now configured for replication).

If the virtual datacenter entities are replicated, or after generating the notification, at block 340, recovery manager 175/180 adds the replicated virtual datacenter entities to one or more recovery plans. For example, an administrator adds one or more protection groups to a new or existing recovery plan to enable the protection groups to be failed over together in a single workflow. As a result, recovery manager 175/180 registers the replicated virtual datacenter entities in the recovery datacenter site inventory with the appropriate device backings (e.g., via the corresponding management server(s) 110/145). In one embodiment, recovery manager 175/180 omits non-replicated virtual datacenter entities from the recovery plan.

At block 345, recovery manager 175/180 determines if an event has occurred to change the storage profile or otherwise trigger a new determination of datacenter entities (e.g., logical storage devices/VMs) included within a storage profile. For example, recovery manager 175/180 looks for events including the addition, removal, or modification of a storage profile (e.g., an addition or removal of a logical storage device to/from the storage profile, an addition or removal of a virtual machine to/from the set of logical storage devices, etc.); the addition, modification, or removal of a virtual disk from a VM; a restart of recovery manager 175/180; etc. In one embodiment, the event is the expiration of a threshold period of time.

If an event has not occurred, method 300 continues to await the occurrence of an event. Otherwise, at block 350, recovery manager 175/180 determines if the event includes removing or otherwise disassociating a VM from the storage profile. If the event includes removing or otherwise disassociating one or more VMs from the storage profile, method 300 returns to block 340 to update the recovery plan (e.g., to unprotect the removed VMs). If the event does not include removing a VM from the storage profile, at block 355, recovery manager 175/180 determines if the event includes adding one or more VMs to the storage profile. If the event includes adding or otherwise associating a new VM with the storage profile, method 300 returns to block 330 to determine if each of the added VMs are configured for replication. If event does not include adding a VM to the storage profile (e.g., at the expiration of a threshold period of time, the restart of the host device, the addition/removal of a logical storage device to/from the storage profile, stopping the replication of a logical storage device, etc.), method 300 returns to block 320 and proceeds as described above to automatically update the protection groups/recovery plan as needed. For example, in response to the addition/removal of a logical storage device to/from the storage profile, method 300 returns to block 320 to determine/update the virtual datacenter entities associated with the protected storage profile. In one embodiment, if the event includes removing or otherwise disassociating a logical storage device from the storage profile, recovery manager 175/180 automatically disassociates the one or more VMs residing on the removed logical storage device from the storage profile. In one embodiment, if the event includes associating an additional logical storage device with the storage profile, recovery manager 175/180 automatically associates the one or more VMs residing on the added logical storage device with the storage profile.

Figure 4:
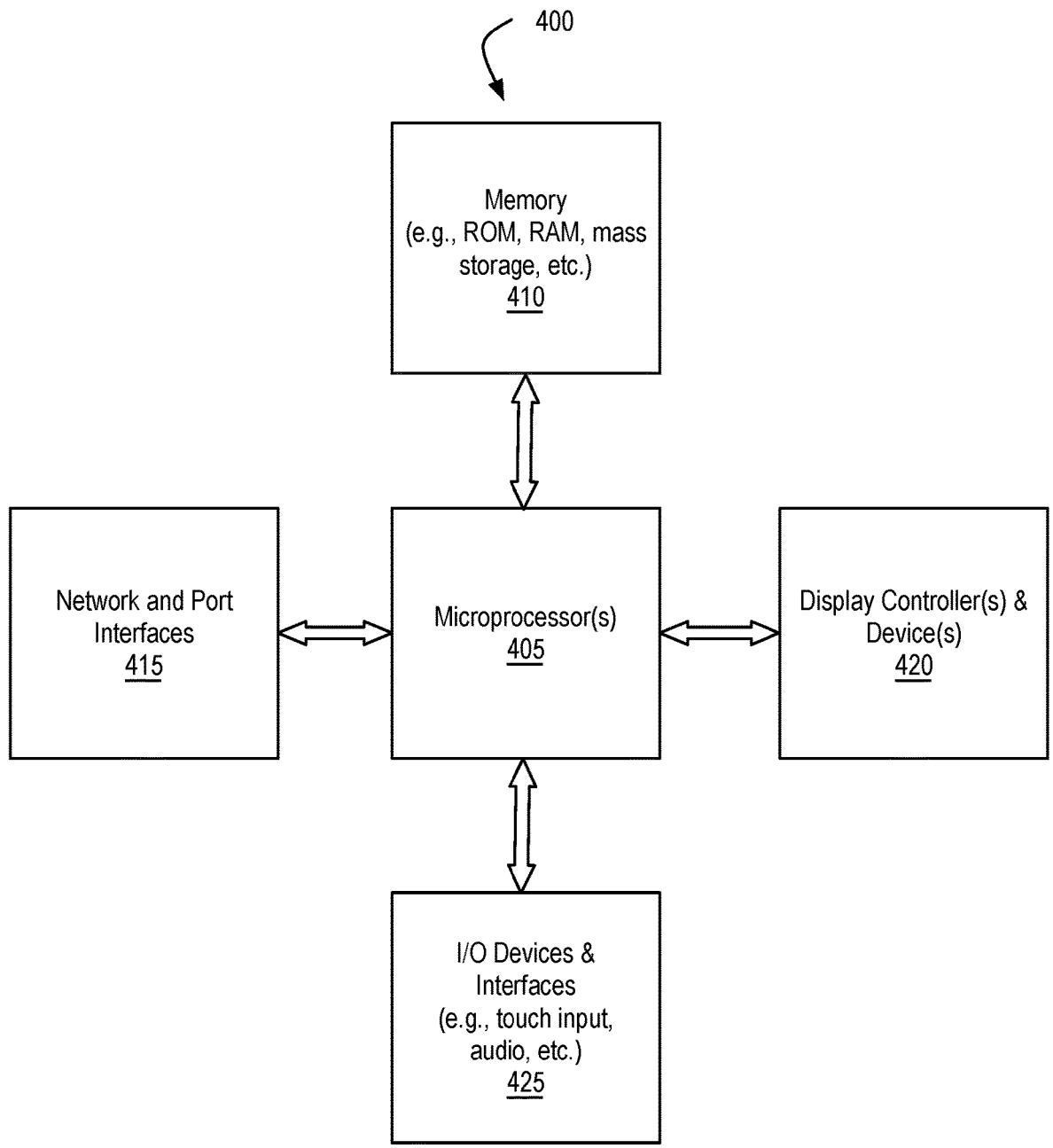
FIG. 4 illustrates, in block diagram form, an exemplary processing system to automate the protection of virtual machines for disaster recovery based upon one or more storage profiles.

FIG. 4 illustrates, in block diagram form, an exemplary processing system to automate the protection of virtual machines for disaster recovery based upon one or more storage profiles. Data processing system 400 includes one or more microprocessors 405 and connected system components (e.g., multiple connected chips). Alternatively, data processing system 400 is a system on a chip.

Data processing system 400 includes memory 410, which is coupled to microprocessor(s) 405. Memory 410 may be used for storing data, metadata, and programs for execution by the microprocessor(s) 405. Memory 410 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 410 may be internal or distributed memory.

Data processing system 400 includes network and port interfaces 415, such as a port, connector for a dock, or a connector for a USB interface, FireWire, Thunderbolt, Ethernet, Fibre Channel, etc. to connect the system 400 with another device, external component, or a network. Exemplary network and port interfaces 415 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 400 with another device, external component, or a network and receive stored instructions, data, tokens, etc.

Data processing system 400 also includes display controller and display device 420 and one or more input or output ("I/O") devices and interfaces 425. Display controller and display device 420 provides a visual user interface for the user. I/O devices 425 allow a user to provide input to, receive output from, and otherwise transfer data to and from the system. I/O devices 425 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 4.

Data processing system 400 is an exemplary representation of one or more of management server A 110, host device(s) 115, storage A 120, management server B 145, host device(s) 150, and storage B 155 described above. Data processing system 400 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 400 may be a network computer, server, or an embedded processing device within another device or consumer electronic product. As used herein, the terms computer, device, system, processing system, processing device, and "apparatus comprising a processing device" may be used interchangeably with data processing system 400 and include the above-listed exemplary embodiments.

It will be appreciated that additional components, not shown, may also be part of data processing system 400, and, in certain embodiments, fewer components than that shown in FIG. 4 may also be used in data processing system 400. It will be apparent from this description that aspects of the inventions may be embodied, at least in part, in software. That is, the computer-implemented methods 200 and 300 may be carried out in a computer system or other data processing system 400 in response to its processor or processing system 405 executing sequences of instructions contained in a memory, such as memory 410 or other non-transitory machine-readable storage medium. The software may further be transmitted or received over a network (not shown) via network interface device 415. In various embodiments, hardwired circuitry may be used in combination with the software instructions to implement the present embodiments. Thus, the techniques are not limited to any specific combination of hardware circuitry and software, or to any particular source for the instructions executed by data processing system 400.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. As used herein, the term "exemplary" refers to embodiments that serve as simply an example or illustration. The use of exemplary should not be construed as an indication of preferred examples. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A method comprising: receiving a selection of one or more storage profiles to be protected as a single group, wherein each storage profile is an abstraction of a set of one or more logical storage devices; determining a set of virtual datacenter entities associated with the one or more selected storage profiles, comprising: determining the one or more logical storage devices included in the selected one or more storage profiles, and determining one or more virtual machines associated with the set of one or more logical storage devices; and adding the set of virtual datacenter entities associated with the selected storage profile to a disaster recovery plan prior to a failover to automate the failover of the set of virtual datacenter entities from a protection site to a recovery site.

2. The method of claim 1, further comprising:
determining whether a virtual machine of the one or more virtual machines is configured for replication, including: querying one or more replication providers to determine whether at least one replication provider is responsible for replicating the virtual machine.

3. The method of claim 2, wherein in response to determining that a virtual machine is replicated, adding the replicated virtual machine to the disaster recovery plan.

4. The method of claim 2, wherein in response to determining that the virtual machine is not replicated, generating a notification that the virtual machine was added to the disaster recovery plan, but is not replicated to the recovery site.

5. The method of claim 2, wherein in response to determining that the virtual machine is not replicated, omitting the non-replicated virtual machine from the disaster recovery plan.

6. The method of claim 2, further comprising: determining that a change has occurred to the one or more storage profiles such that one or more logical storage devices are no longer included in the selected storage profile, and in response to the determining, updating the disaster recovery plan to remove one or more corresponding virtual machines associated with the no longer included logical storage devices.

7. The method of claim 1, further comprising: determining that a change has occurred to the one or more storage profiles such that one or more logical storage devices are added to the selected storage profile; and in response to the determining, updating the disaster recovery plan to add one or more corresponding virtual machines associated with the added logical storage devices.

8. A system comprising: one or more processing devices and one or more storage media, wherein the one or more storage-media include instructions that, when executed by the one or more processing devices, cause the system to perform operations comprising: receiving a selection of one or more storage profiles to be protected as a single group, wherein each storage profile is an abstraction of a set of one or more logical storage devices; determining a set of virtual datacenter entities associated with the one or more selected storage profiles, comprising: determining the one or more logical storage devices included in the selected one or more storage profiles, and determining one or more virtual machines associated with the set of one or more logical storage devices; and adding the set of virtual datacenter entities associated with the selected storage profile to a disaster recover plan prior to a failover to automate the failover of the set of virtual datacenter entities from a protection site to a recovery site.

9. The system of claim 8, wherein the instructions further cause the system to perform operations comprising:
determining whether a virtual machine of the one or more virtual machines is configured for replication, including: querying one or more replication providers to determine whether at least one replication provider is responsible for replicating the virtual machine.

10. The system of claim 9, wherein in response to determining that a virtual machine is replicated, adding the replicated virtual machine to the disaster recovery plan.

11. The system of claim 9, wherein in response to determining that the virtual machine is not replicated, generating a notification that the virtual machine was added to the disaster recovery plan, but is not replicated to the recovery site.

12. The system of claim 9, wherein in response to determining that the virtual machine is not replicated, omitting the non-replicated virtual machine from the disaster recovery plan.

13. The system of claim 8, wherein the instructions further cause the system to perform operations comprising: determining that a change has occurred to the one or more storage profiles such that one or more logical storage devices are no longer included in the storage profile, and in response to the determining, updating the disaster recovery plan to remove one or more corresponding virtual machines associated with the no longer included logical storage devices.

14. The system of claim 8, wherein the instructions further cause the system to perform operations comprising:
determining that a change has occurred to the one or more storage profiles such that one or more logical storage devices are added to the storage profile; and
in response to the determining, updating the disaster recovery plan to add one or more corresponding virtual machines associated with the added logical storage devices.

15. One or more non-transitory computer-readable media storing instructions that, when executed by a processing device, cause the processing device to perform operations comprising: receiving a selection of one or more storage profiles to be protected as a single group, wherein each storage profile is an abstraction of a set of one or more logical storage devices; determining a set of virtual datacenter entities associated with the one or more selected storage profiles, comprising: determining the one or more logical storage devices included in the selected one or more storage profiles, and determining one or more virtual machines associated with the set of one or more logical storage devices; and adding the set of virtual datacenter entities associated with the selected storage profile to a disaster recovery plan prior to a failover to automate the failover of the set of virtual datacenter entities from a protection site to a recovery site.

16. The one or more non-transitory computer-readable media of claim 15, wherein the instructions, when executed, further cause the processing device to perform operations comprising:
determining whether a virtual machine of the one or more virtual machines is configured for replication, including: querying one or more replication providers to determine whether at least one replication provider is responsible for replicating the virtual machine.

17. The one or more non-transitory computer-readable media of claim 16, wherein in response to determining that a virtual machine is replicated, adding the replicated virtual machine to the disaster recovery plan.

18. The one or more non-transitory computer-readable media of claim 16, wherein in response to determining that the virtual machine is not replicated, generating a notification that the virtual machine was added to the disaster recovery plan, but is not replicated to the recovery site.

19. The one or more n on-transitory computer-readable media of claim 16, wherein in response to determining that the virtual machine is not replicated, omitting the non-replicated virtual machine from the disaster recovery plan.

20. The one or more non-transitory computer-readable media of claim 15, wherein the instructions, when executed, further cause the processing device to perform operations comprising: determining that a change has occurred to the one or more storage profiles such that one or more logical storage devices are no longer included in the selected storage profile; and in response to the determining, updating the disaster recovery plan to remove one or more corresponding virtual machines associated with the no longer included logical storage devices.

* * * * *